US008009918B2

(12) United States Patent
Van Droogenbroeck et al.

(10) Patent No.: US 8,009,918 B2
(45) Date of Patent: Aug. 30, 2011

(54) VISUAL BACKGROUND EXTRACTOR

(75) Inventors: Marc Van Droogenbroeck, Wemmel (BE); Olivier Barnich, Liège (BE)

(73) Assignee: Universite De Liege, Angleur (BE)

( * ) Notice: Subject to any disclaimer, the term of this patent is extended or adjusted under 35 U.S.C. 154(b) by 0 days.

(21) Appl. No.: 12/452,563

(22) PCT Filed: Jun. 16, 2008

(86) PCT No.: PCT/EP2008/057563
§ 371 (c)(1),
(2), (4) Date: Apr. 19, 2010

(87) PCT Pub. No.: WO2009/007198
PCT Pub. Date: Jan. 15, 2009

(65) Prior Publication Data
US 2010/0208998 A1   Aug. 19, 2010

(30) Foreign Application Priority Data
Jul. 8, 2007  (EP) ...................................... 07112011

(51) Int. Cl.
*G06K 9/62* (2006.01)
*G06K 9/00* (2006.01)
(52) U.S. Cl. ........................................ 382/224; 382/181
(58) Field of Classification Search .................. 382/100, 382/181, 224; 396/7; 348/61, 142, 152–153; 707/722–735
See application file for complete search history.

(56) References Cited

U.S. PATENT DOCUMENTS
4,350,998 A    9/1982  Verhoeven
4,746,770 A *  5/1988  McAvinney .............. 178/18.09
(Continued)

FOREIGN PATENT DOCUMENTS
WO    WO 93/05488    3/1993
(Continued)

OTHER PUBLICATIONS

Wang et al. "A consensus-based method for tracking: Modelling background scenario and foreground appearance." Pattern Recognition, vol. 40, No. 3, Nov. 6, 2006, pp. 1091-1105.
(Continued)

*Primary Examiner* — Samir A Ahmed
*Assistant Examiner* — Mehdi Rashidian
(74) *Attorney, Agent, or Firm* — Jacobson Holman PLLC

(57) ABSTRACT

The present invention relates to a Visual Background Extractor (VIBE) consisting in a method for detecting a background in an image selected from a plurality of related images. Each one of said set of images is formed by a set of pixels, and captured by an imaging device. This background detection method comprising the steps of: establishing, for a determined pixel position in said plurality of images, a background history comprising a plurality of addresses, in such a manner as to have a sample pixel value stored in each address; comparing the pixel value corresponding to said determined pixel position in the selected image with said background history, and, if said pixel value from the selected image substantially matches at least a predetermined number of said sample pixel values: classifying said determined pixel position as belonging to the image background; and—updating said background history by replacing the sample pixel values in one randomly chosen address of said background history with said pixel value from the selected image. The method of the invention is applicable a.o. for video surveillance purposes, videogame interaction and imaging devices with embedded data processors.

18 Claims, 8 Drawing Sheets

U.S. PATENT DOCUMENTS

| | | | |
|---|---|---|---|
| 5,109,435 A * | 4/1992 | Lo et al. | 382/103 |
| 5,534,917 A * | 7/1996 | MacDougall | 348/169 |
| 6,061,476 A | 5/2000 | Nichani | |
| 7,058,204 B2 * | 6/2006 | Hildreth et al. | 382/103 |
| 7,136,525 B1 | 11/2006 | Toyama et al. | |
| 2002/0064382 A1 | 5/2002 | Hildreth et al. | |
| 2006/0120619 A1 | 6/2006 | Avidan et al. | |
| 2006/0222205 A1 | 10/2006 | Porikli et al. | |

FOREIGN PATENT DOCUMENTS

| | | |
|---|---|---|
| WO | WO 01/16885 | 3/2001 |
| WO | WO 03/036557 | 5/2003 |
| WO | WO 2005/024651 | 3/2005 |

OTHER PUBLICATIONS

Zivkovic et al. "Efficient adaptive density estimation per image pixel for the task of background subtraction." Pattern Recognition Letters, vol. 27, 2006, 773-780.

Zivkovic et al. "Improved adaptive Gaussian mixture model for background subtraction." in Proc, ICPR, 2004.

Wren et al. "Pfinder: real-time tracking of the human body." MIT Media Laboratory Perceptual Computing Section Technical Report No. 353, Jul. 1997, vol. 19, No. 7, pp. 780-785.

Stauffer et al. "Adaptive background mixture models for real-time tracking." The Artificial Intelligence Laboratory.

Zang et al. "Robust background subtraction and maintenance."

Radke et al. "Image change detection algorithms: A systematic survey." IEEE Transactions on Image Processing, vol. 14, No. 3, Mar. 2005, 294-307.

Power et al. "Understanding background mixture models for foreground segmentation." Proceedings Image and Vision Computing, New Zealand 2002.

Piccardi. "Background subtraction techniques: a review." 2004 IEEE International Conference on Systems, Man and Cybernetics.

Stauffer et al. "Learning patterns of activity using real-time tracking." IEEE Transactions on Pattern Analysis and Machine Intelligence, vol. 22, No. 8, Aug. 2000.

Lee. "Effective Gaussian mixture learning for video background subtraction." IEEE Transactions on Pattern Analysis and Machine Intelligence, vol. 27, No. 5, May 2005.

Koller et al. "Towards robust automatic traffic scene analysis in real-time." Proceedings of the International Conference on Pattern Recognition, 1994.

Haritaoglu, et al. "$W^4$: Real-Time surveillance of people and their activities." IEEE Transactions on Pattern Analysis and Machine Intelligence, vol. 22, No. 8, Aug. 2000.

Elgammal et al "Background and foreground modeling using nonparametric kernel density estimation for visual surveillance." Proceedings of the IEEE, vol. 90, No. 7, Jul. 2002.

International Search Report dated Jul. 30, 2008.

* cited by examiner

VISUAL BACKGROUND EXTRACTOR

This is a national stage of PCT/EP08/057563 filed Jun. 16 2008 and published in English, which has a priority of European no. 07112011.7 filed Jul. 8, 2007, hereby incorporated by reference.

The present invention relates to a method for detecting a background in an image selected from a plurality of related images, each formed by a set of pixels, and captured by an imaging device.

One of the major research areas in computer vision is the field of motion tracking in video sequences. The aim of motion tracking is to extract the movement of an object in a scene and sometimes the movement of the imaging device generating images of said scene. The human eye and brain carry out this kind of operation easily, but in computer vision it is a difficult problem to solve, and it involves several tasks, such as:

- separating the moving objects from the static or pseudo-static background, wherein a pseudo-static background is defined as a background with a slight apparent motion due to a motion of the imaging device;
- solving the occlusion problem, which involves re-identifying an object that is momentarily at least partially lost to view;
- eliminating so-called ghost objects, resulting from falsely considering as part of the background real objects present in the first image frame of a sequence of images; and
- identifying and removing shadow effects.

A video sequence is formed by a sequence of images I, captured successively in time, wherein each image I comprises a plurality of picture elements, or pixels, each single pixel in an image having a position x in the image and a pixel value $I(x)$. The position x may have any number of dimensions. Although pixels with three-dimensional positions are also known as "voxels" (for "volume elements") in the domain of 3D imaging, the expression pixel should also be understood throughout the present text as also including such "voxels". The image can thus be a conventional two-dimensional image, but also a 3D image and/or a multispectral image. This position x may, or may not be limited to a finite domain. In the case of images captured by a moving imaging device, such as, for example, a satellite on-board camera, the position x will not be limited to a finite domain. Depending on the type of image, the pixel value $I(x)$ may be scalar, as in monochromatic images, or multidimensional, as in polychromatic images, such as red-green-blue (RGB) component video images or hue saturation value (HSV) images.

The step of separating the moving objects from the background is generally called background subtraction. Background subtraction involves the recognition of which pixels in each image belong to the background and removing them from the image.

Background subtraction is also used in other applications, such as medical imaging systems. A medical image may be compared with a background generated using images of the same region in other patients to show outliers possibly indicating a pathological condition.

To be efficient, a background subtraction technique should:
- be universal, that is, it should be capable to handle any type of video sequences;
- be robust with respect to noise;
- be simple, since simple techniques are easier to implement and need fewer parameter adjustments depending on the scene content;
- be fast, involving as few computations as possible;
- be accurate in shape detection;
- have a small footprint, although with the decreasing cost of memory, it is not crucial to minimize the memory space needed;
- be directly usable, requiring only a fast initialization, if any;
- be adaptable to gradual or fast illumination changes, due, for instance to the changing time of day or to clouds, motion of the imaging device, high frequency motion of background objects, such as tree leaves or branches, and changes in the background geometry, due, for instance, to parked cars.

There are numerous existing background subtraction methods. Surveys of such methods have been disclosed by M. Piccardi in "Background subtraction techniques: a review", Proceedings of the IEEE International Conference on Systems, Man and Cybernetics, vol. 4, 2004, pages 3099-3104, and by R. Radke, S. Andra, O. Al-Kofahi, and B. Roysam in "Image change detection algorithms: A systematic survey", IEEE Transactions on Image Processing, 14(3): 294-307, 3 2005.

A first approach to background subtraction is the so-called naïve approach. Following this naïve approach, a simple background model assumes that background pixel values are constant over time. The background and foreground are then recognized by comparing the values of the pixels in the image with those of an earlier image of the same sequence, as disclosed, for instance, in U.S. Pat. No. 6,061,476. Differences can be caused by noise in the image data, illumination changes in the scene, or motion. Noise and global illuminations are dealt with by applying a filter or by using a detector targeting illumination changes. However, discarding the motion of background objects is more difficult, especially if one keeps in mind the requirements given above.

In practice, the difference between two images is thus inefficient and background recognition methods have to allow for a distribution of background pixel values to cope with noise or illumination changes. Therefore, extended techniques have been proposed. These methods, hereafter called model-based approaches, build a model $m(x)$ for the value $I(x)$ of each pixel. The model is used to compare a pixel value with previous pixel values for the same pixel position. For example, the $W^4$ algorithm disclosed by I. Haritaoglu, D. Harwood, and L. Davis in "$W^4$: Real-time surveillance of people and their activities", IEEE Transactions on Pattern Analysis and Machine Intelligence", 22(8): 809-830, 2000, models the background by the minimum and maximum pixel values, and the maximum difference between two consecutive images during a training stage. More advanced model-based approaches comprise the following steps:

Initialization: The purpose of initialization is to build a valid estimate of the model parameters from the first images of a sequence.

Comparison: The current pixel value is checked against the model.

Model update: If the pixel value fits reasonably well with the model, then the parameters and thus the model are updated. If the pixel value does not match the model, the new value is not used to update the model, as otherwise the model would diverge.

Depending on the type of model, comparison strategy or updating process, several categories of model-based background subtraction methods have been proposed.

In a first category of model-based background subtraction method, the background pixel model is a predicted background pixel value, based on a statistical measure, such as, for instance a weighted average of pixel values. Background subtraction methods of this category have been disclosed, for instance, in U.S. Pat. No. 7,136,525, U.S. Pat. No. 4,350,998, International Patent Application WO 01/16885, US 2006/0120619 or US Patent Application 2002/0064382. In one of its simplest forms, the background pixel model is based on a weighted average of previous pixel values in the same pixel position. If $m_t(x)$ denotes the pixel value provided by the model for the pixel position x at time t, and $m_{t+1}(x)$ the pixel value provided by the model for the same pixel position x at the next time t+1, the update formula will then be:

$$m_{t+1}(x)=\alpha I_t(x)+(1-\alpha)m_t(x) \quad (1)$$

where $\alpha$ is a weighting factor between 0 and 1. The image formed by the model pixel values $m_t(x)$ constitutes an estimate of the background.

While the calculation of a weighted-average background pixel model is comparatively simple, in some situations a single predicted pixel value, such as a simple weighted average, does not provide a comprehensive model of the background. For this reason, in a second category of model-based background subtraction method, so-called parametric models are used which provide a probability density function (pdf) of background pixel values at a certain pixel position, wherein the pdf is characterized by a set of parameters. For example, in C. Wren, A. Azarbayejani, T. Darrell, and A. Pentland disclosed in "Pfinder: Real-time tracking of the human body", IEEE Transactions on Pattern Analysis and Machine Intelligence, 19(7):780-785, 1997, a background model which assumes that the pixel values over a time window at a given position are Gaussian distributed. A Gaussian background model is also proposed in US Patent Application US 2006/0222205. Complex methods, such as the background subtraction method disclosed in International Patent Application WO 03/036557, estimate a mean vector and covariance matrix for each pixel position. Sometimes this is combined with the use of Kalman filtering to adapt their values, as disclosed, for example, by D. Koller, J. Weber, T. Huang, J. Malik, G. Ogasawara, B. Rao, and S. Russell in "Towards robust automatic traffic scene analysis in real time", Proceedings of the International Conference on Pattern Recognition, Israel, 1994. However, the main drawback of the method remains: the uni-modal nature of the model prevents it to deal correctly with the multi-modal appearance caused by the motion present in the background of a dynamic environment, such as in tree leaves, flickering monitors, etc.

To solve this problem, and still within the category of parametric models, the use of a weighed mixture of Gaussian distributions to model the background was first proposed by C. Stauffer and E. Grimson in "Adaptive background mixture models for real-time tracking", Proceedings of the IEEE Conference on Computer Vision and Pattern Recognition, pages 246-252, 6 1999, and in "Learning patterns of activity using real-time tracking", IEEE Transactions on Pattern Analysis and Machine Intelligence, 22(8):747-757, 2000. Since its introduction, this Gaussian Mixture Model (GMM) has gained in popularity among the computer vision community, as can be seen in the above-mentioned surveys, as well as in the article by P. Power and J. Schoonees, "Understanding background mixture models for foreground segmentation", Proc. Images and Vision Computing, Auckland, NZ, 11 2002, and is still raising a lot of interest, as seen in the disclosures by Z. Zivkovic, "Improved adaptive gaussian mixture model for background subtraction", Proceedings of the International Conference on Pattern Recognition, 2004, by Qi Zang and R. Klette, "Robust background subtraction and maintenance", ICPR '04: Proceedings of the 17th International Conference on Pattern Recognition, Volume 2, pages 90-93, Washington D.C., USA, 2004, and by D.S. Lee, "Effective Gaussian mixture learning for video background subtraction", IEEE Transactions on Pattern Analysis and Machine Intelligence, 27(5):827-832, May 2005, as well as in the International Patent Application WO 2005/024651. Nevertheless, GMM has some fundamental drawbacks as it strongly rests on the assumptions that the background is more frequently visible than the foreground and that its variance is significantly lower. Neither of these assumptions is valid for every time window. Furthermore, if high- and low-frequency changes are present in the background, its sensitivity can't be accurately tuned and the model may adapt itself to the targets themselves or miss the detection of some high speed targets, as noted by A. Elgammal, R. Duraiswami, D. Harwood and L. S. Davis in "Background and Foreground Modeling Using Nonparametric Kernel Density Estimation for Visual Surveillance", Proceedings of the IEEE, Vol. 90, No. 7, July 2002, pages 1151-1163. Finally, the estimation of the model parameters, especially of the variance, can become problematic in real-world noisy environments.

These problems have been addressed by a third category of background models, namely, so-called non-parametric models. These models are quite similar to parametric models except that they do not try to estimate parameters of pre-defined probability density functions but instead estimate a kernel density function directly from real pixel values without any assumptions about their underlying distribution. This avoids having to choose a function and estimating its distribution parameters.

One of the strengths of non-parametric kernel density estimation methods, as disclosed by A. Elgammal et al in their abovementioned paper, and by Z. Zivkovic and F. van der Heijden in "Efficient adaptive density estimation per image pixel for the task of background subtraction", Pattern Recognition Letters, 27(7):773-780, 2006, is their ability to circumvent a part of the parameter estimation step as they are based on actually observed pixel values. They model the kernel density of a background pixel using a set of real values sampled from its recent history and can thus provide fast responses to high-frequency events in the background by directly including newly observed values in the pixel model. However, their ability to successfully handle concomitant events evolving at various speeds is debatable since they update their pixel and models in a first-in first-out manner. As a matter of fact, they often use two sub-models for each pixel: a short term model and a long term model.

While this can be a convenient solution, it seems artificial and requires fine tuning to work properly in a given situation. Finding a smoother lifespan policy for the sampled values that constitute the pixel models would be a salient improvement.

The use of real observed pixel values in non-parametric background pixel models, besides the fact that it reduces the number of parameters to estimate, makes also sense from a stochastic point of view since already observed values often have a higher probability to be observed again than never encountered ones. However, a whole set of parameters remains: the parameters of the kernel functions, unless using a significant amount of fixed-size kernels. As a matter of fact, a kernel density estimation method can also suffer from incorrect parameter estimation related problems.

Since all of the above mentioned methods work at pixel level, they have the additional drawback of requiring additional post-processing to obtain spatial consistency.

To address these drawbacks, a new background detection method called SAmple CONsensus, or SACON, has been proposed by H. Wang and D. Suter in "A consensus-based method for tracking: Modelling background scenario and foreground appearance", Pattern Recognition, 40(3):1091-1105, March 2007. This article, which appears to constitute the closest prior art, discloses a method for detecting a background in an image selected from a plurality of related images, each formed by a set of pixels, and captured by an imaging device, this background detection method comprising the steps of:

- establishing, for a determined pixel position in said plurality of images, a background history comprising a plurality of addresses, in such a manner as to have a sample pixel value stored in each address;
- comparing the pixel value corresponding to said determined pixel position in the selected image with said background history, and, if said pixel value from the selected image substantially matches at least a predetermined number of sample pixel values of said background history:
- classifying said determined pixel position as belonging to the image background; and
- updating said background history by replacing one of its sample pixel values with said pixel value from the selected image More precisely, the SACON method keeps a history of N background sample pixel values for each pixel position. These samples are simply the N last observed values that fit within the model. N ranges from 20 to 200, but the authors concluded that N=20 is the absolute minimum that must be used in most practical tasks. However, diagrams provided in the paper indicate that N=60 should lead to the best performance.

The article does not mention any initialization process. It can however be assumed that the first N samples are used to fill the history, so that an initialization of 1 to 2 seconds, at a frame rate of 30 images per second, is necessary before the algorithm produces appropriate results.

The method simply counts the number of times that sample pixel values stored in the background history for a determined pixel position substantially match with the pixel value for that pixel position in the selected image. By "substantially match" it is meant throughout this text that the sample pixel value is within a given range around the pixel value of the selected image. In this SACON method, this range is adaptive and depends on the sample pixel values. For the predetermined minimum number of sample pixel values in the background history with which the pixel value of the selected image should match to be classified as belonging to the image background, the article mentions that it is determined empirically and that it depends on N.

The background history update in this closest prior art is carried out on a first-in, first-out basis, that is, the current pixel value will replace the oldest pixel value in the background history. Moreover, in order to remove ghost objects, once a pixel position has been classified as foreground for a predetermined number of times, it will be recognized as belonging to the background and the background history for that pixel position accordingly updated with the last N pixel values for that pixel position. Furthermore, to ensure spatial coherence, there is an additional updating mechanism at the blob level, which handles sets of connected (neighbouring) foreground pixels. Foreground blobs that are static, that is, whose size and centre are substantially constant, are also incorporated into the background. Such a method of providing spatial coherence does however require significant additional computing capacity, and will only be as reliable as the blob detection.

The SACON method does however present some significant drawbacks. Foremost among them is that, due to its first-in, first-out background history updating mechanism, the sample background pixel values are stored in the history for a fixed lapse of time. Because of this, the behaviour of this background detection method will vary significantly depending on the background evolution rate and the number of sample values in the background history.

An objective of the present invention is thus that of providing a background detection method adapted to a wider range of background evolution rates.

In order to achieve this objective, in the method of the present invention the address of the sample pixel value to be replaced is randomly chosen. This results in a smoother lifespan policy whose induced exponential decay for the expected remaining lifespan of the sample values in the history is better from a theoretical point of view and enables an appropriate behaviour of the technique for a wider range of background evolution rates even with a small history size.

Moreover, while the deterministic methods of the state of the art are vulnerable to bias and adversely affected by noise which has to be suppressed by previous filtering, this random technique has inherent noise resilience, making such filtering of the pixel values unnecessary. The method of the invention thus has the additional surprising advantages of bringing sharper segmentation results at the borders of the foreground objects, where decision boundaries of deterministic processes are often overlapping, and strongly reinforcing the robustness of the method, especially when dealing with noisy image data.

Furthermore, while the SACON method requires an adaptive comparison threshold between the current pixel value and the sample pixel values, the method of the invention also has the additional surprising advantage of achieving very satisfactory results with the same fixed comparison range for all pixels. This removes the need of the SACON method for estimating complex sets of threshold parameters for an effective background detection for all pixels in the image in a variety of environmental circumstances, which negatively affects the simplicity and practicality of the SACON method.

Advantageously, the method of the invention may further comprise a random update selection step, wherein it is randomly determined with a predetermined background history update probability whether said updating step is to be carried out or not. This allows a reduction of the number of necessary computations, while increasing the noise resilience and improving the time behaviour and decreasing the bias of the background detection method of the invention.

A further objective of the present invention is that of completing the background history without a lengthy initialisation. In a particular embodiment of the method of the invention, the step of establishing said background history may comprise reading pixel values in neighbouring pixel positions in at least one image of said plurality of images, other than said selected image, and storing these pixel values, randomly sorted in the plurality of addresses of said background history, as sample pixel values. This can provide a complete background history initialisation with a single image, greatly reducing the time necessary for this method to start providing reliable background detection. For increased noise and bias resilience, said neighbouring pixel positions may be randomly chosen within a neighbourhood of the determined pixel position.

A further objective of the present invention is that of providing a degree of spatial coherence without post-processing and without having to define blobs of purportedly interconnected pixels. In order to achieve this, in an advantageous embodiment of the background recognition method of the present invention, if said pixel value in said determined pixel position of said selected image substantially matches at least said predetermined number of sample pixel values in the history of said determined pixel position, a background history corresponding to a neighbouring pixel, comprising another plurality of addresses, and established in such a manner as to have a sample pixel value stored in each address, is also updated by replacing the sample pixel value in a randomly chosen address in said background history of the neighbouring pixel with the pixel value of the determined pixel position in the selected image. Said neighbouring pixel background history may advantageously be randomly chosen within a neighbourhood of said determined pixel, so as to avoid bias. Also advantageously, the method may further comprise a random neighbouring pixel history update selection step, wherein it is randomly determined with a predetermined neighbouring pixel background history update probability whether a neighbouring pixel history is to be updated or not, so as to reduce computing operations while avoiding bias.

Since the background histories contain a plurality of sample pixel values, irrelevant information accidentally inserted into the neighbouring pixel background history does not affect the accuracy of the method. Furthermore, the erroneous diffusion of irrelevant information is blocked by the need to match an observed value before it can further propagate. This natural limitation inhibits error propagation.

In order to broaden even further the range of background evolution rates to which the background recognition system of the present invention is adapted, in an advantageous embodiment of this method at least one auxiliary history, corresponding to said determined pixel position and also comprising a plurality of addresses, is also established in such a manner as to have a sample pixel value stored in each address, and, if said pixel value from the selected image does not substantially match at least said predetermined number of sample pixel values of the background history, the method may also comprise the following steps:

comparing said pixel value from the selected image with said auxiliary history, and, if it substantially matches at least a further predetermined number of sample pixel values of said auxiliary history:

randomly determining with an auxiliary history update probability higher than the background history update probability whether the auxiliary history is to be updated or not; and, if yes, updating said auxiliary history by replacing a sample pixel value from a randomly selected address in the auxiliary history with said pixel value from the selected image.

This provides at least one auxiliary image layer with a different time response characteristic to which the current pixel values can be compared, allowing discriminating between background changes and motion at various speeds.

The at least one auxiliary history may advantageously be used for ghost suppression. At the first observation of a previously unseen part of the scene, the corresponding pixels are wrongly classified as foreground and constitute so-called ghost data. In an embodiment of the invention with only the background layer, an insertion in the background history of a determined pixel of neighbouring pixel values for ensuring spatial consistency, as described above, will progressively move these ghost pixels to the background. However, this spatial diffusion process can be slow or even ineffective when neighbouring pixels exhibit major dissimilarities, such as at the boundaries of a background object.

In order to address this problem, if said pixel value from the selected image substantially matches at least said further predetermined number of sample pixel values of said auxiliary history, the method may further comprise the steps of:

randomly determining with a predetermined background seeding probability lower than the auxiliary history update probability whether the background history is also to be updated with the pixel value from the selected image; and, if yes, updating the background history by replacing a sample pixel value from a randomly selected address in the background history with said pixel value from the selected image.

These additional steps seed the background history with new values which can accelerate the spatial diffusion process for ghost suppression inside the objects.

To further reduce the processing necessary for the background detection, in an advantageous embodiment the background detection method of the invention may also comprise the steps of dividing said selected image into a plurality of sub-sampling areas, and randomly selecting one such determined pixel position in each sub-sampling area as representative of the whole sub-sampling area. In previous methods it has been proposed to select sample pixels as located on a regular grid. When using a linear model, this required a preliminary filtering in order to be compliant with the Nyquist stability, which had the inconvenient of introducing new pixel values not actually present in the original image, and thus possibly introduce unwanted artefacts. By randomly selecting the sampled pixels, preliminary filtering becomes unnecessary, and such artefacts as may result from such filtering are prevented.

Advantageously, the method further comprises a step of reallocating the background history from another pixel position within said image to said determined pixel position in response to image motion, such as panning or zooming. This provides a compensation for apparent background motion due to image motion, in particular for large imaging device motion, such as imaging device travelling.

Advantageously, since existing imaging devices often incorporate embedded motion sensors, the pixel position from which the background history is reallocated may be based on the motion detected by a motion sensor of the imaging device.

Advantageously, since existing imaging devices may be equipped with zoom devices with zoom value sensors, the pixel position from which the background history is reallocated may be based on a zoom value of the imaging device.

Advantageously, since existing imaging devices may be equipped with image processors for carrying out block matching algorithms, the pixel position from which the background history is reallocated may be determined based on a correspondence obtained by a block matching algorithm, such as, for example, that used in the standard MPEG video encoding process.

The present invention relates also to a data processing device programmed so as to carry out the image background recognition method of the invention; to a data storage medium comprising a set of instructions for a data processing device to carry out an image background recognition method according to the invention; to a set of signals in magnetic, electromagnetic, electric and/or mechanical form, comprising a set of instructions for a data processing device to carry out an image background recognition method according to the invention; and/or to a process of transmitting, via magnetic, electromagnetic, electric and/or mechanical means, a set of instructions for a data processing device to carry out an image background recognition method according to the invention.

In particular, said data processing device programmed so as to carry out the image background recognition method of the invention may be embedded in an imaging device, such as, for example, a digital camera.

Said data processing device programmed so as to carry out the image background recognition method of the invention may also belong to a videogame system or video-surveillance system further comprising an imaging device.

As "data storage medium" is understood any physical medium capable of containing data readable by a reading device for at least a certain period of time. Examples of such data storage media are magnetic tapes and discs, optical discs (read-only as well as recordable or re-writable), logical circuit memories, such as read-only memory chips, random-access memory chips and flash memory chips, and even more exotic data storage media, such as chemical, biochemical or mechanical memories.

As "electromagnetic" any part of the electromagnetic spectrum is understood, from radio to UV and beyond, including microwave, infrared and visible light, in coherent (LASER, MASER) or incoherent form.

As "object" is understood any observable element of the real world, including animals and/or humans.

A particular embodiment of the invention will now be described in an illustrative, but not restrictive form, with reference to the following figures.

Figure 1:
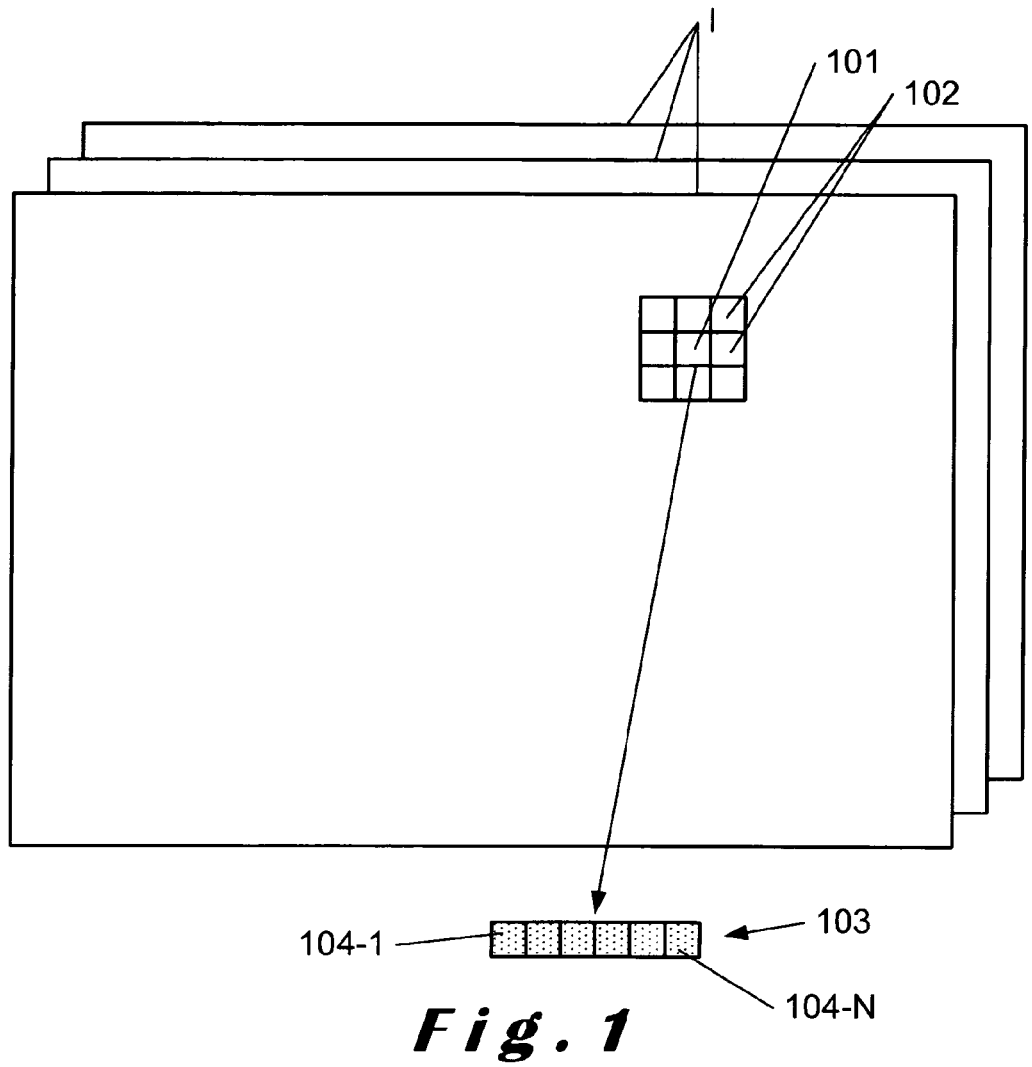
FIG. 1 shows a schematic view of a set of images comprising an image including a determined pixel with a background history and neighbouring pixels.

FIG. 1 shows a set of images I. These images may have been, for example, successively captured by an imaging device. Each image I is formed by a plurality of pixels, each single pixel in an image I having a dedicated pixel position x and a pixel value I(x). For ease of understanding, in the accompanying drawings, the pixel position x is shown as two-dimensional, but it could have any number of dimensions. For 3D images, for instance, the pixel position x may have three dimensions. The pixel value I(x) in the illustrated embodiment is three-dimensional, in the form of RGB- or HSV-triplets for obtaining a polychromatic image. In alternative embodiments, it could however have any other number of dimensions. A determined pixel 101 will have a number of neighbouring pixels 102.

In the selected image $I_t$ corresponding to observation t, pixel 101 has a pixel value $I_t(x)$. For the pixel position x of pixel 101, there is a background history 103 with N addresses 104-1 to 104-N, in which sample pixel values $b_1(x)$ to $b_N(x)$ are stored, representing a background model for that pixel position x. Turning now to the flowchart represented in FIG. 2, it can be determined whether pixel 101 in the selected image $I_t$ belongs to the background by reading. in step 201, its value $I_t(x)$ in said selected image $I_t$, and comparing it, in step 202, with the background history 103. This comparison step 202 is illustrated in FIG. 3 for a background history 103 of N=6 addresses containing sample pixel values $b_1(x)$ to $b_6(x)$, and the pixel value $I_t(x)$ in a three-dimensional space. Instead of estimating a probability density function, the pixel value $I_t(x)$ is compared to the closest sample pixel values within the background history 103, so as to limit the influence of outliers in said background history 103. To achieve this, a sphere $S_{R,t}(x)$ of radius R centred on the pixel value $I_t(x)$ is defined. Then a cardinality, that is, the number C of set elements of the intersection set of this sphere and the set of sample pixel values $\{b_1(x), b_2(x), \ldots, b_N(x)\}$ is determined:

$$C = \#\{S_{R,t}(x) \cap \{b_1(x), b_2(x), \ldots, b_N(x)\}\} \qquad (2)$$

Pixel 101 will be classified in step 203 as belonging to the background if this cardinality C is higher than or equal to a minimum number. The two parameters determining the accuracy of the background recognition are thus the radius R, forming the comparison threshold, and said minimum matching cardinality C. Experiments have shown that a single fixed radius R and a minimum cardinality of 2 for N=6 sample pixel values offer excellent performances. There is no need to adapt these parameters during the background detection nor is it necessary to change them for different pixel positions x within the image I. The sensitivity of the model can be adjusted with the ratio between the minimum matching cardinality C and the total number N of sample pixel values $b_1(x)$ to $b_N(x)$.

While in the illustrated embodiment N=6, in alternative embodiments N could be a different number according to circumstances. Advantageously, but not necessarily, N may be in a range between 3 and 50. A preferred range would be between 5 and 30, and in a particularly preferred embodiment N=20.

Figure 2:
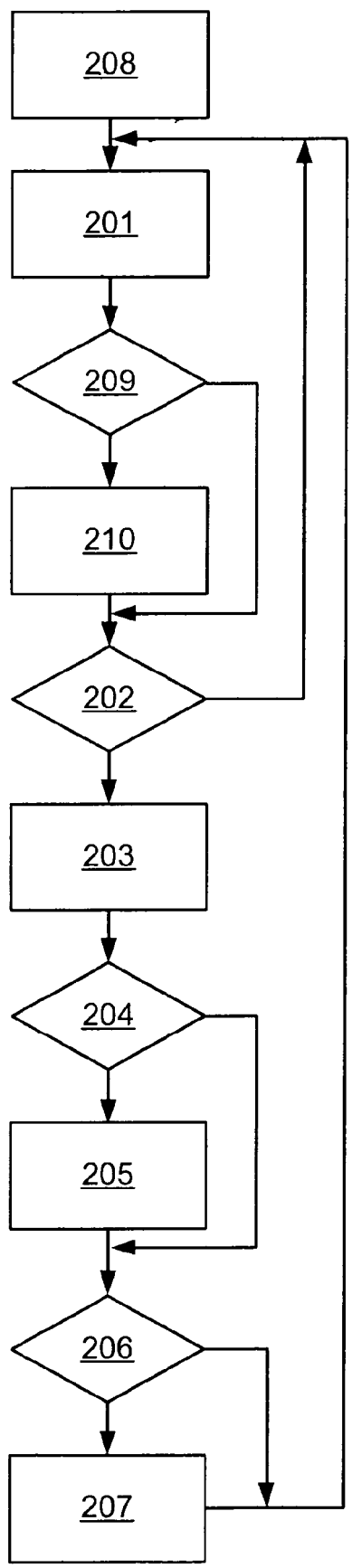
FIG. 2 shows a flowchart illustration of an embodiment of the background detection method of the invention.
Figure 3:
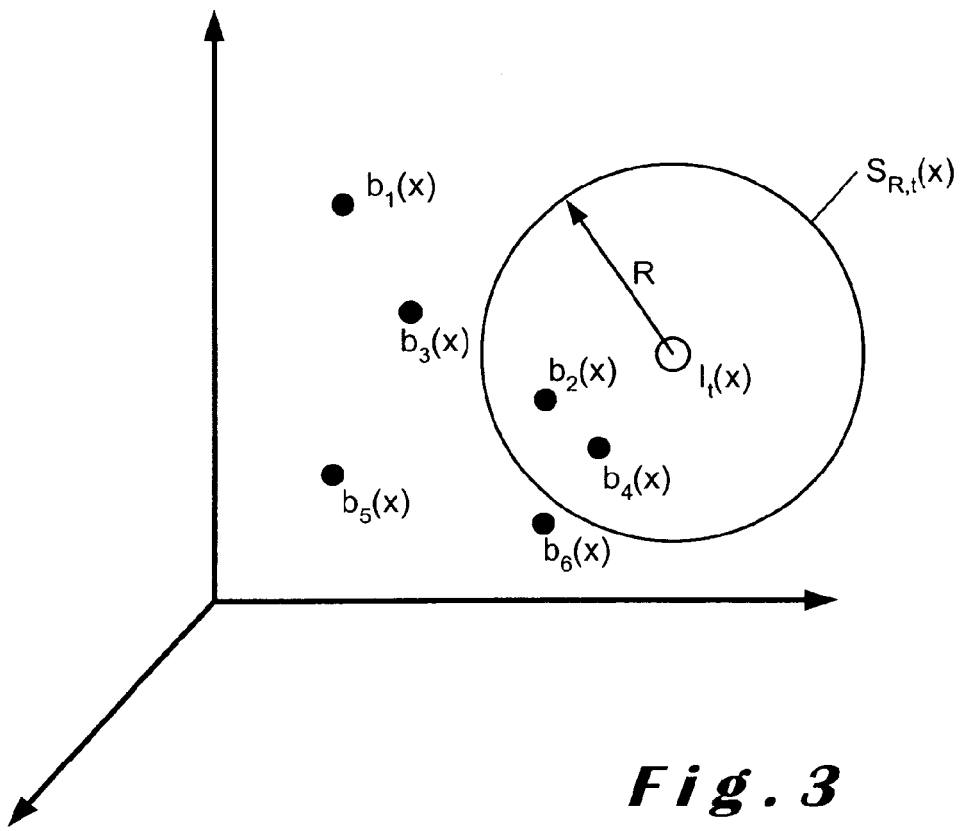
FIG. 3 shows a diagram of a pixel value and sample pixel values of the background history of that determined pixel.

Turning back to the flowchart of FIG. 2, the next step 204 is that of randomly determining whether the pixel value $I_t(x)$ is to be used in updating the background history 103. If this is the case, the update will take place in the next step 205. In this background recognition method a conservative update scheme is used, that is, only if the pixel 101 is confirmed as belonging to the background in the comparison step 202 may its current pixel value $I_t(x)$ be used to update its background history 103. To achieve accurate results over time and to handle new objects appearing in a scene, the background history 103 has to be updated frequently. Since in this method the pixel value $I_t(x)$ is compared directly to the sample pixel values $b_1(x)$ to $b_N(x)$ in the background history 103, and there is thus no smoothing effect on the sample pixel values, the question of which sample pixel values are to be kept in the background history 103, and how, is important.

Figure 4A:
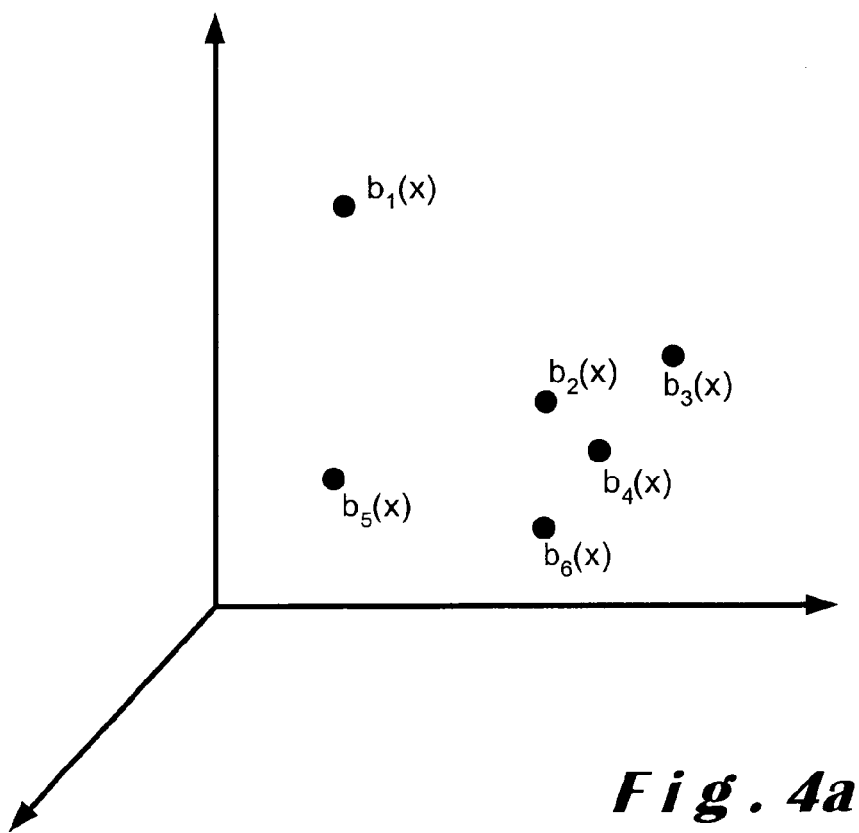
FIGS. 4a-4c shows diagrams with the sample pixel values of possible alternative background histories resulting from updating the background history of FIG. 3 by replacing a randomly chosen one of its sample pixel values with the current pixel value.
Figure 4B:
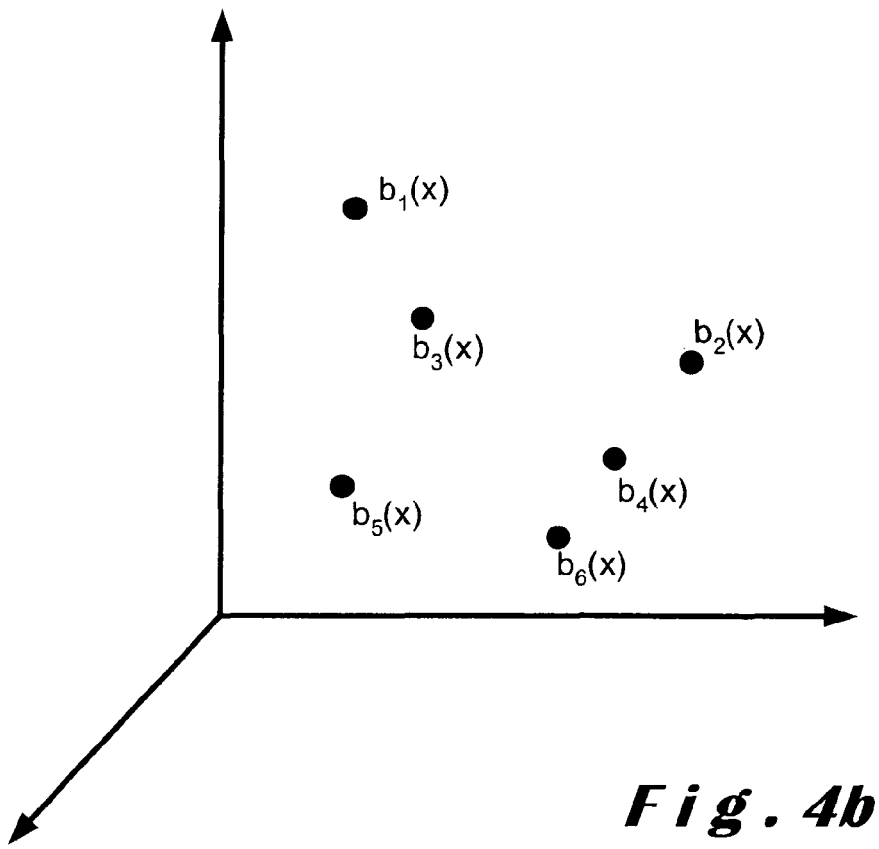
Figure 4C:
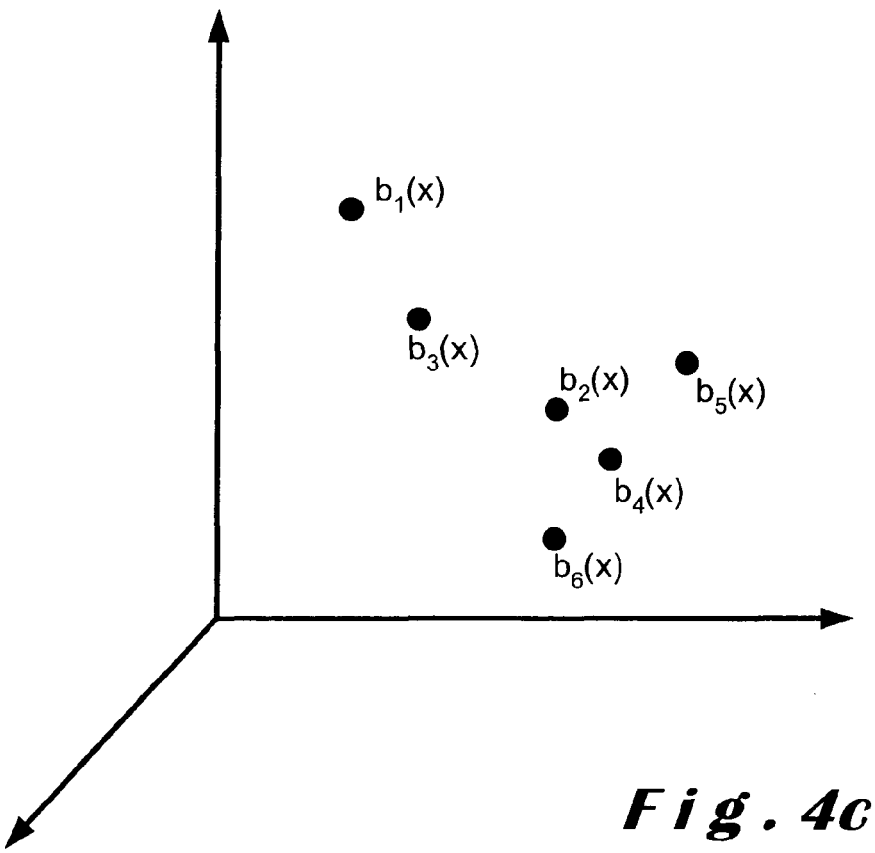

In the random update selection step 204, a random technique is used to determine whether a sample pixel value will be effectively replaced in the background history 103. Even if the pixel 101 has been confirmed as belonging to the background, its pixel value $I_t(x)$ will only randomly be used to replace one of the sample pixel values in the background history 103, for example with a random history update probability of 1 in 16. Then, in updating step 205, the pixel value $I_t(x)$ will replace a sample pixel value in a randomly chosen address 104-$i$, wherein $i$ is a random number between 1 and N, of the background history 103. This is illustrated in FIGS. 4$a$ to 4$c$, showing three alternative updates to the background history 103 illustrated in FIG. 3. In FIG. 4$a$, the pixel value $I_t(x)$ has replaced sample pixel value $b_3(x)$. In FIG. 4$b$, it has replaced $b_2(x)$ instead, whereas in FIG. 4$c$, it has replaced $b_5(x)$.

When the background history 103 is updated, the probability of a sample pixel value to be conserved is:

$$\frac{N-1}{N} \tag{3}$$

After the updating step 205, the method may be repeated again for the pixel value $I_{t+1}(x)$ of pixel 101 in the next image $I_{t+1}$. With every successive effective update, the expected remaining lifespan of each sample pixel value in the background history 103 will decay exponentially.

To respond to some situations, such as small movements and oscillations of the imaging system, or slowly evolving background objects, it is favourable to introduce some spatial consistency between the background history 103 of pixel 101, and those of pixels 102 in a spatial neighbourhood $N_G(x)$ of pixel 101. These pixels 102 may include directly neighbouring pixels, as illustrated in FIG. 1, but also those in a broader spatial neighbourhood $N_G(x)$. To achieve this, in a neighbouring pixel background history update selection step 206 it may be randomly decided, possibly with a different probability than for the update selection step 204, whether, in a second updating step 207, the pixel value $I_t(x)$ of pixel 101 is to be used to update the background history of a randomly chosen neighbouring pixel 102. As in the previous updating step 205, the background history 103 is updated by replacing a sample pixel value at a randomly chosen address 104-$i$ of said background history 103.

To carry out the earlier comparison step 202 it is however necessary to establish the background history 103 first. While, after a certain time, all the sample pixel values $b_1(x)$ to $b_N(x)$ in the background history 103 can be expected to originate from previous updates, at the beginning of a sequence of images there are no previous pixel values for pixel 101 available as sample pixel values. To establish the background history 103 an initialisation step 208 is carried out using, for example, the first image $I_1$ of the set of images I. In this initialisation step 208, the pixel values of randomly chosen neighbouring pixels 102 in, for example, said first image $I_1$, are selected as the initial sample pixel values $b_1(x)$ to $b_N(x)$ in the N addresses 104-1 to 104-N of the background history 103 of pixel 101. A complete background model can thus be established from the first image $I_1$ in the sequence without a lengthy initialisation period. While this initialisation step 208 has the drawback of generating ghost objects in response to moving objects in the first image $I_1$, later updates will ensure that they fade over time.

Neighbouring pixels 102 from differently-sized spatial neighbourhoods $N_G(x)$ may be used for the initialisation step 208 and for the second updating step 207. For instance, to initialise a background history 103 comprising N=20 sample pixel values, a broader spatial neighbourhood $N_G(x)$ of 5×5, or even 7×7 pixels around said determined pixel 101 may be chosen. On the other hand, for the second updating step 207 for improving spatial consistency, a narrow spatial neighbourhood $N_G(x)$ of 3×3 pixels, or even of only the four closest neighbouring pixels 102 (left, right, top and bottom) may be chosen.

A synthetic background image $B_t$ can be created for a given image $I_t$ using:

the pixel values of the pixels 101 in said image $I_t$ which are classified as belonging to the background;

for the pixels 101 in said image $I_t$ which are not classified as belonging to the background, one of the sample pixel values in its background history 103, preferably from a randomly selected address 104-$i$ in said background history 103.

This synthetic background image $B_t$ may be used, for instance, in a shadow detection post-processing technique in which the image $I_t$ will be compared with the background image $B_t$ and/or, for the detection of abandoned objects in video-surveillance, where said background image $B_t$ will be used to regularly update a reference image R which will be compared with current images in a manner known to the skilled person to detect abandoned objects.

In practical situations, neither the imaging device nor the objects in the scene are necessarily fixed. Some imaging devices may provide motion parameters, such as a translation vector, parameters of an affine transformation, or parameters of axial transformations, such as zoom values. If at least a minimum such motion is detected in a step 209, this allows for the reallocation of the background history from another pixel 105 to the determined pixel 101, in a motion compensation step 210 before the comparison step 202, as illustrated in FIGS. 5$a$ to 5$c$.

Said motion parameters determine the relative position of pixel 105 to pixel 101, and may be obtained by motion sensors and/or zoom sensors embedded in the imaging device, and/or by techniques establishing a correspondence between areas in different images I directly based on the image data. For example, many consumer market digital cameras have embedded motion sensors for digital motion compensation, which may also be used to obtain those motion parameters. Also, encoders compliant with the ISO MPEG standards apply a block matching algorithm for building a one-to-one correspondence between areas of two images which may also be used to obtain those motion parameters.

In this reallocation process, if two pixel positions are uniquely paired to each other, the background history 103 is simply reallocated from its old location at pixel 105 to its new location at pixel 101. However, if an image $I_t$ contains at least one pixel not present in the previous image $I_{t-1}$, sample pixel values from the background history of the closest pixel in the previous image $I_{t-1}$, or, alternatively, random values, may be used to fill its background history 103.

Figure 5A:
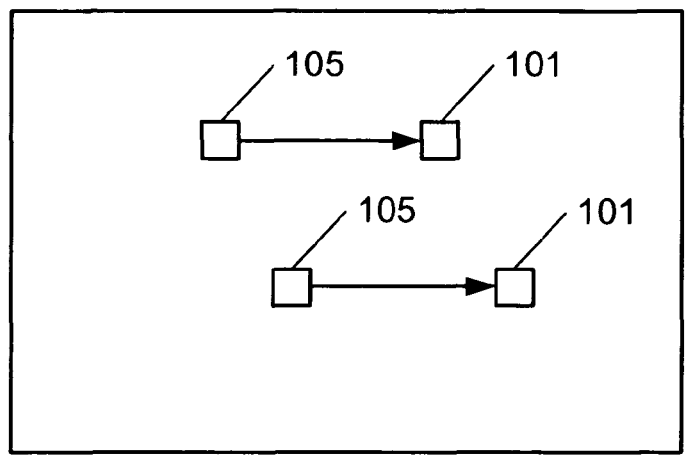
FIGS. 5a-5c shows a diagram showing the reallocation of background histories in response to, respectively, panning, zooming in and zooming out.

FIG. 5$a$ illustrates background history reallocation in the case of a panning motion of the imaging device. As the imaging device travels from right to left on an axis parallel to the image plane, the background histories of pixels 105 will be reallocated to the corresponding pixels 101 to their right, leading to consistent results of the background detection method of the invention for those pixels 101, despite the fact that the imaging device is moving. However, while in two consecutive images $I_{t-1}$, $I_t$ a majority of pixels may correspond to the intersection between the scenes seen in both images $I_{t-1}$, $I_t$, some pixels from $I_{t-1}$, will move out of the image frame, while others will appear in $I_t$ corresponding to parts of the scene which were visible in the previous image $I_{t-1}$. The background histories of the former (in the illustrated example, those on the right side) may be discarded or saved for latter use. The background histories of the latter (in the illustrated example, those on the left side) may be instantaneously initialised or recovered from a previous memorisation, for example if the imaging device had previously traveled in the opposite direction.

Figure 5B:
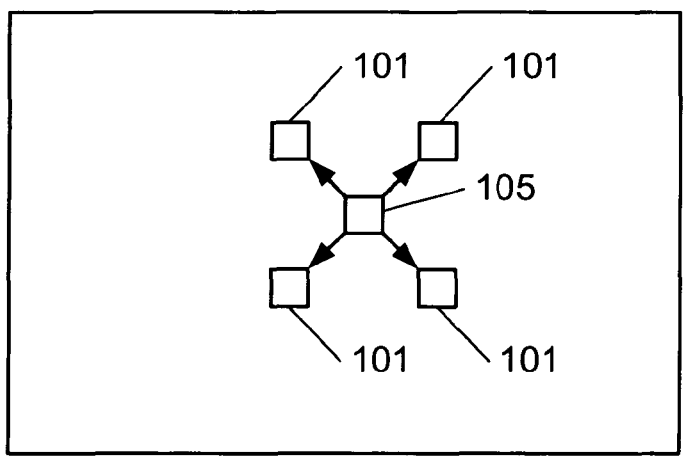

FIG. 5b illustrates background history reallocation in the case of a closing-up motion or a zoom-in of the imaging device. In this case, the reallocated background histories will move away from the centre of the image $I_t$. The background histories of the pixels closest to the edge of the previous image I may be discarded or saved for later use. As the number of pixels corresponding to a given part of the scene will increase in the image $I_t$ with respect to the previous image $I_{t-1}$, the background history of a pixel 105 in image $I_{t-1}$ may be reallocated to several pixels 101 in image $I_t$.

Figure 5C:
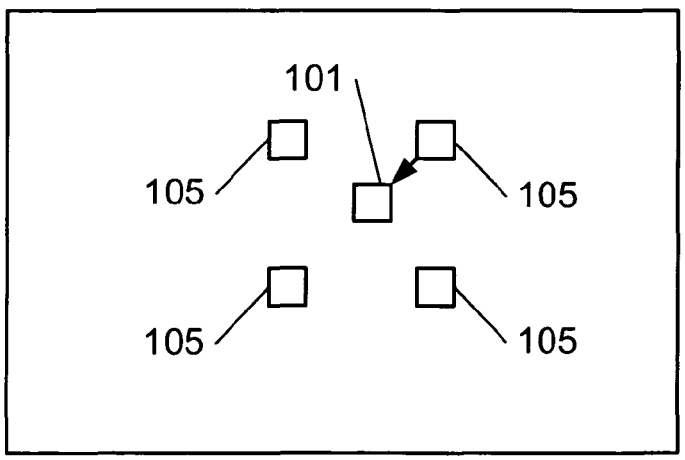

FIG. 5c illustrates background history reallocation in the case of a retreating motion or a zoom-out of the imaging device. In this case, the reallocated background histories will move towards the centre of the image $I_t$. As the number of pixels corresponding to a given part of the scene will decrease, not all background histories from pixels 105 in the previous image $I_{t-1}$ will however find a corresponding pixel 101 in image $I_t$ to be reallocated to. Close to the edge of the image $I_t$ will appear pixels corresponding to parts of the scene that were not visible in the previous image $I_{t-1}$. The histories of these pixels may be instantaneously initialised or recovered from a previous memorisation, for example if the imaging device had previously zoomed in.

If the block-matching algorithm detects a moving object, its corresponding pixel values $I_t(x)$ in the image $I_t$ may be excluded from the background history updates.

Figure 6:
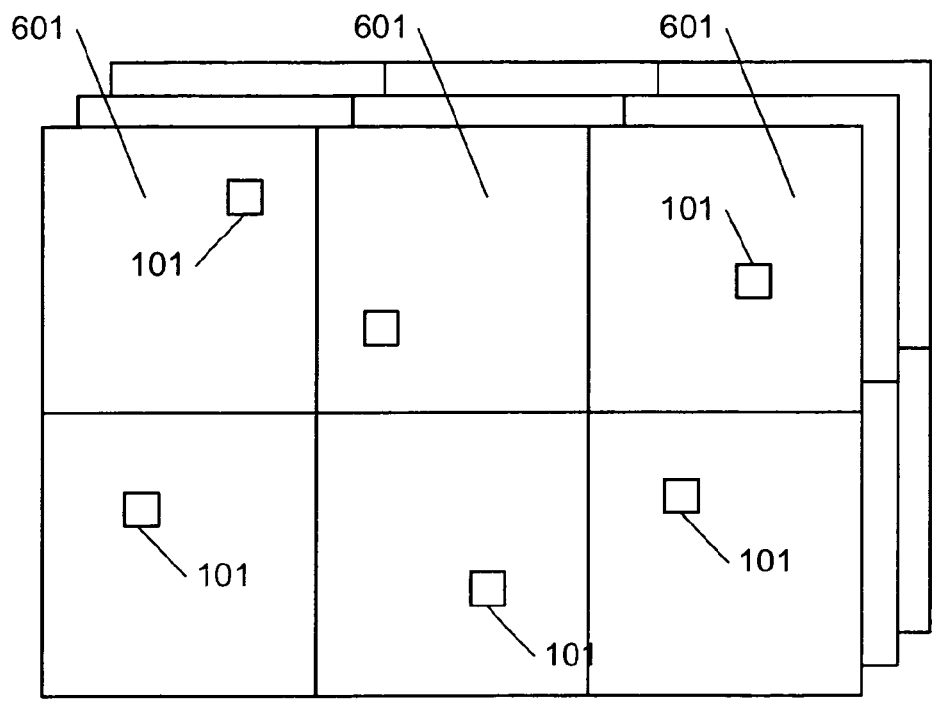
FIG. 6 shows a schematic view of an image divided in sub-sampling areas.

In a first embodiment of the invention, the above-mentioned method will be carried out on every pixel of each image I of the set of images. However, in some situations, processing speed may be more important than using the whole definition of the image. Since the method offers good performances at any scale, it is then possible to detect the image background by carrying out the method of the invention on a selected subset of pixels from the set of pixels of each image I, that is, by sub-sampling the original image data set, reducing the image to a lower resolution. The pixels in this subset may be randomly chosen. FIG. 5 shows an example of how this may be carried out. In the embodiment of FIG. 6, each image I of the sequence is divided into a plurality of sub-sampling areas 601. In each sub-sampling area 601, a single determined pixel 101 is randomly chosen as representing the whole sub-sampling area 601. For each image I in the set of images, this random pixel selection is carried out once again.

Figure 7:
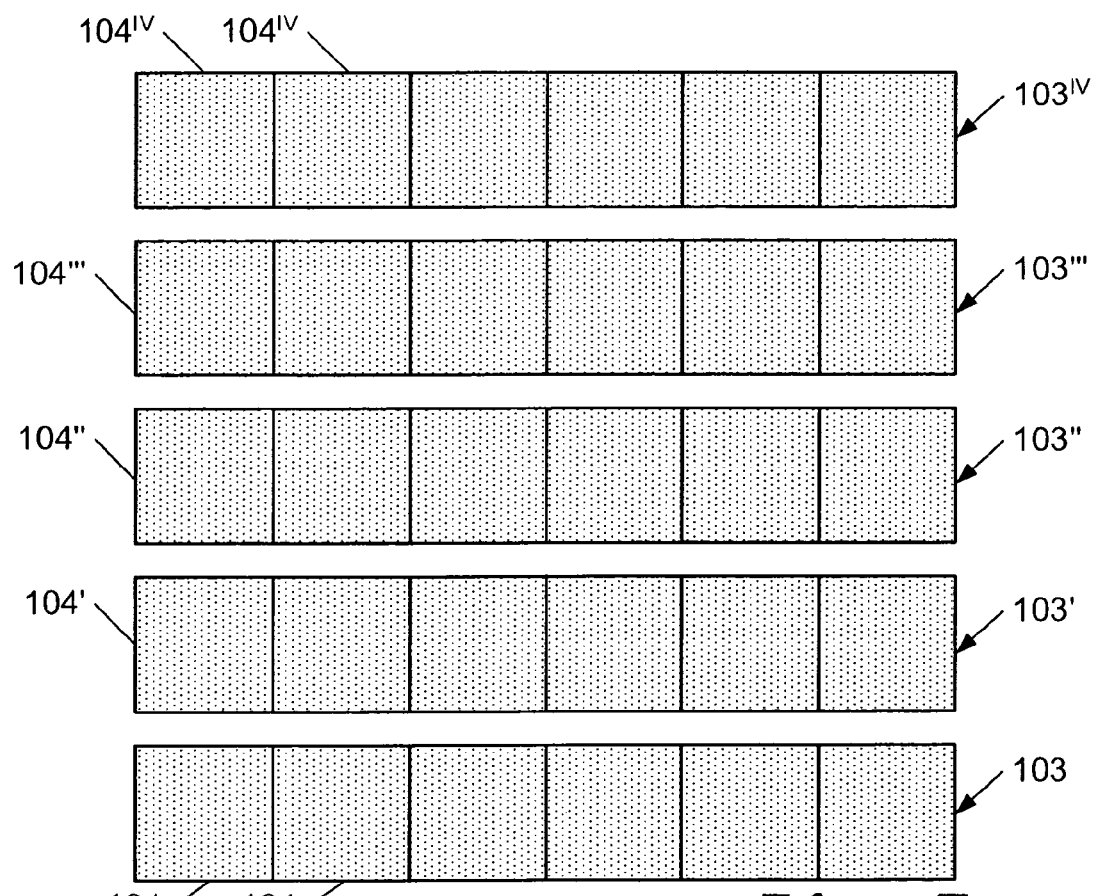
FIG. 7 shows a diagram of a background history and a plurality of auxiliary histories for a determined pixel position.
Figure 8:
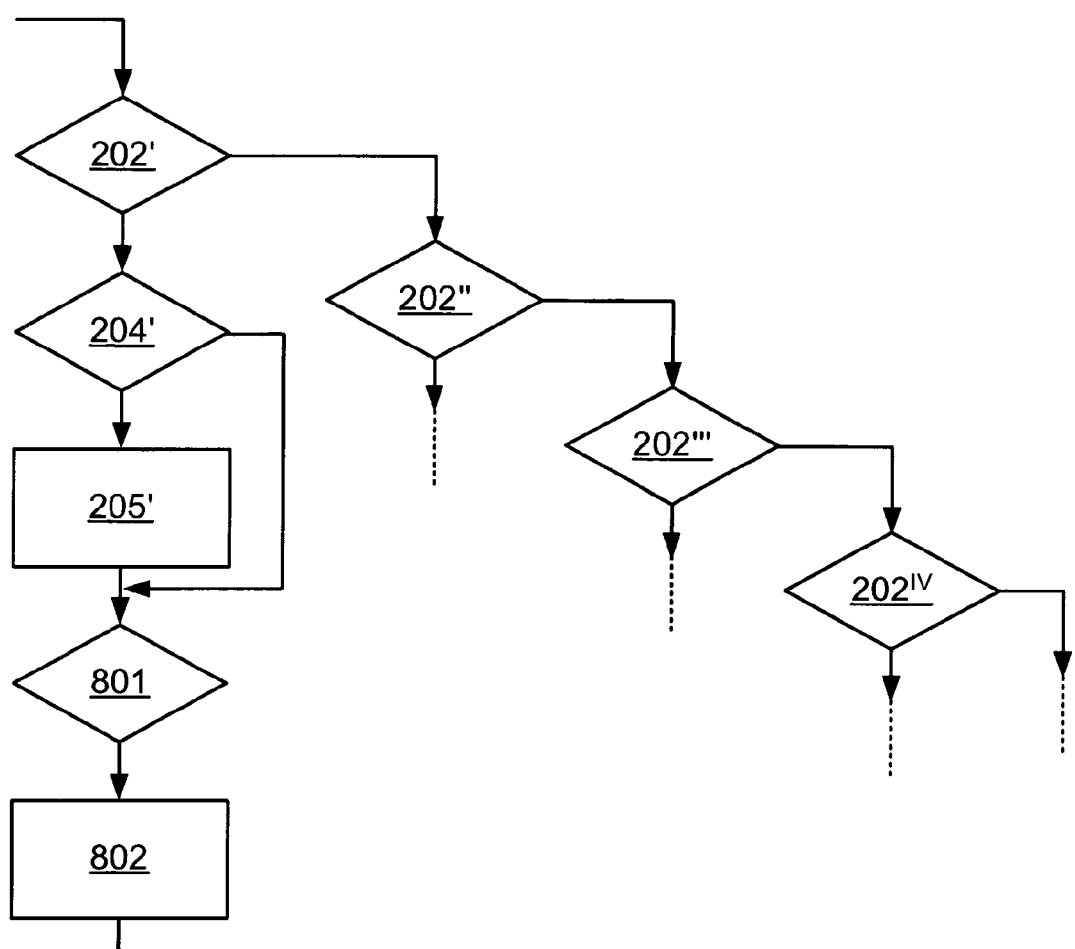
FIG. 8 shows a flowchart illustration of part of an alternative background detection method of the invention.

In another alternative embodiment of the invention, illustrated in FIGS. 7 and 8, a set of auxiliary histories 103', 103", 103'" and $103^{IV}$ are established for the pixel position x of each determined pixel 101. In alternative embodiments of the invention, different numbers of auxiliary histories may be used.

Each one of these auxiliary histories 103', 103", 103'" and $103^{IV}$ has, like background history 103, the following parameters:

number N of available addresses 104',104",104'" or $104^{IV}$ for sample pixel values in, respectively, said additional history 103', 103", 103'" or $103^{IV}$;

maximum distance R between a current pixel value $I_t(x)$ and a sample pixel value in said auxiliary history 103', 103", 103'" or $103^{IV}$ for the pixel value $I_t(x)$ to be considered to substantially match said sample pixel value;

number C of sample values in said auxiliary history 103', 103", 103'" or $103^{IV}$ which a pixel value $I_t(x)$ must substantially match to be considered as belonging to said auxiliary history 103', 103", 103'" or $103^{IV}$; and history update probability defining the probability of using a pixel value $I_t(x)$ for updating said auxiliary history 103', 103" ... or $103^{IV}$ when it is considered for an update.

In the illustrated embodiment, each auxiliary history 103', 103", 103'" and $103^{IV}$ of a pixel 101 may have the same number N, maximum distance R and threshold cardinality C than the background history 103, even if different parameters could also be chosen. However, each auxiliary history 103', 103", 103'" and $103^{IV}$ is characterised by a different auxiliary history update probability higher than the background history update probability. An increasing auxiliary history update probability decreases the inertia of each auxiliary history, defined as its slowness to adapt to changes in successive images I. A history with high inertia will thus account for pixel values observed over a large number of images I, while a history with low inertia will be able to model fast changing values. For example, with a background history update probability of $\frac{1}{16}$, the auxiliary history update probabilities used for updating the auxiliary histories 103',103", 103'" and $103^{IV}$ of the illustrated embodiment may be, respectively, $\frac{1}{8}$, $\frac{1}{4}$, $\frac{1}{2}$ and 1.

As in the previously described embodiment, a background history 103 may be initialised by filling its addresses 104-1 to 104-N with randomly sorted values of randomly chosen neighbouring pixels 102 in a first image h. However, as it may be assumed that all pixels in said first image $I_1$ belong to the background, each one of the auxiliary histories 103', 103", 103'" and $103^{IV}$ may be initialised with random values. The auxiliary histories 103', 103", 103'" and $103^{IV}$ will then adapt as soon as more information becomes available.

The current pixel value $I_t(x)$ will be hierarchically compared to the corresponding history 103, 103', 103", 103'" and $103^{IV}$, as illustrated in FIG. 8. Starting from the background history 103, the value $I_t(x)$ will be recursively checked against each history 103, 103', 103", 103'" and $103^{IV}$.

So, if the pixel value $I_t(x)$ of the selected image $I_t$ did not match the background history 103 in the abovementioned comparison step 202, it will then be compared with the first auxiliary history 103' in a first auxiliary history comparison step 202'. If it substantially matches at least C sample pixel values stored in the addresses 104'-1 to 104'-N of said first auxiliary history 103', it will be considered, in a random update selection step 204' with a first auxiliary history update probability such as, for example, the abovementioned $\frac{1}{8}$, whether to update the first auxiliary history 103' with the pixel value $I_t(x)$ in a first auxiliary history update step 205', wherein said pixel value $I_t(x)$ will replace a sample pixel value in a randomly chosen address 104'-i of the first auxiliary history 103'.

If the pixel value $I_t(x)$ does however not match said at least C sample pixel values stored in said first auxiliary history 103', it will then be compared in a second auxiliary history comparison step 202" with the second auxiliary history 103". Again, if it substantially matches at least C sample pixel values stored in said second auxiliary history 103", it will proceed to a similar random update selection step (not shown), with a higher update probability such as, for example, the abovementioned $\frac{1}{4}$, and eventually a similar updating step (not shown) of the second auxiliary history 103". If the pixel value $I_t(x)$ does not substantially match at least C sample pixel values stored in said second auxiliary history 103", an analogous procedure will be executed for the third auxiliary history 103'", with an even higher update probability such as, for example, the abovementioned $\frac{1}{2}$, and, if the pixel value $I_t(x)$ does not substantially match at least C sample pixel values stored in said third auxiliary history 103'", an analogous procedure will be executed for the fourth auxiliary history $103^{IV}$, with an even higher update probability such as, for example, the abovementioned 1.

The method of the invention may also incorporate for each auxiliary history, such as the four auxiliary histories 103', 103'', 103''' and $103^{IV}$ of the illustrated embodiment, the same techniques as described above for the background history 103 for ensuring spatial consistency, compensating image motion and/or reducing processing time by spatial sub-sampling.

When a block-matching algorithm is used, at least one auxiliary history of a pixel corresponding to a moving object detected by said black-matching algorithm may be reallocated according to its movement to increase the consistency of this auxiliary history.

In an image $I_t$, the pixels 101 with pixel values $I_t(x)$ that have been matched to an auxiliary history may be used to generate an image layer possibly intermediary between the background and the foreground.

At least one auxiliary history may be used for ghost suppression. For this purpose, the pixel value $I_t(x)$ of a pixel 101 matched to an auxiliary history may also be used to update the background history 103, or a lower-ranked auxiliary history. This is also illustrated in the embodiment shown in FIG. 8, wherein, if the pixel value $I_t(x)$ is matched with the first auxiliary history 103', it is determined, in another update selection step 801 with a lower probability, such as, for example 1/2048, than the probability of updating the first auxiliary history 103', whether to update, in a different updating step 802, the background history 103 with said pixel value $I_t(x)$. This will insert small background seeds inside the ghost data which will help the abovementioned spatial diffusion process to remove ghosts. Eventually, the same procedure may be used to update the first auxiliary history 103' with a pixel value $I_t(x)$ that has been matched in step 202'' to the second auxiliary history 103'', to update the second auxiliary history 103'' with a pixel value $I_t(x)$ that has been matched in step 202''' to the third auxiliary history 103''', and so on.

The background detection method of the invention may be carried out with assistance of a data processing device, such as, for example, a programmable computer, connected to the imaging device. In such a case, the data processing device may receive instructions for carrying out this background detection method using a data storage medium, or as signals in magnetic, electromagnetic, electric and/or mechanical form.

In the various embodiments of the invention, there is extensive use of random numbers. These numbers may be provided by a random number generator. However, since such random numbers cannot be provided by a deterministic computer, a pseudorandom number generator may be used instead with properties similar to those of a true random number generator. Another alternative is the use of a large look-up list of previously generated random or pseudorandom numbers.

The background detection method of the invention may, for example, be applied to video-surveillance, professional and/or consumer digital still and/or video cameras, computer and videogame devices using image capture interfaces, satellite imaging and Earth observation, automatic image analysis and/or medical imaging systems.

Figure 9:
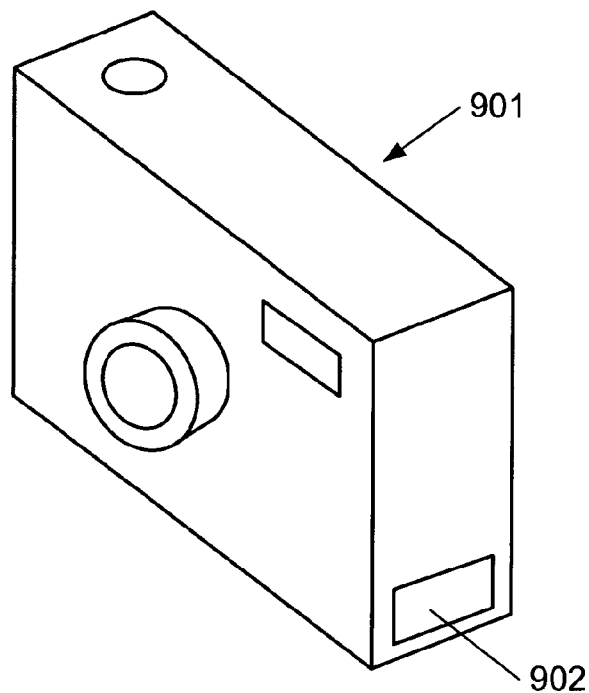
FIG. 9 shows an imaging device with an embedded data processing device programmed to carry out an embodiment of the method of the invention.
Figure 10:
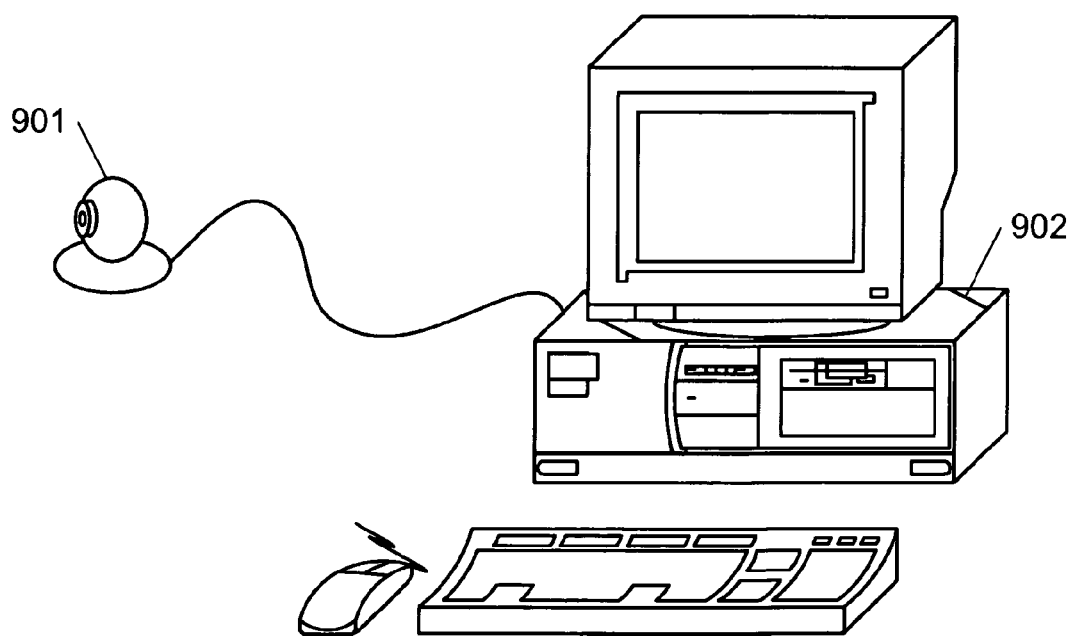
FIG. 10 shows an imaging device connected to a data processing device programmed to carry out an embodiment of the method of the invention.

FIG. 9 illustrates a possible application of the invention with an imaging device 901 in the particular form of a digital camera with an embedded data processing device 902 programmed to carry out the method of the invention. FIG. 10 illustrates another possible application of the invention with an imaging device 901 connected for video surveillance or interaction with a videogame system with a data processing device 902 programmed to carry out the method of the invention.

Although the present invention has been described with reference to specific exemplary embodiments, it will be evident that various modifications and changes may be made to these embodiments without departing from the broader scope of the invention as set forth in the claims. Accordingly, the description and drawings are to be regarded in an illustrative sense rather than a restrictive sense.

The invention claimed is:

1. A method for detecting a background in an image selected from a plurality of related images, each formed by a set of pixels, and captured by an imaging device, this background detection method comprising the steps of:
   establishing, for a determined pixel position in said plurality of images, a background history comprising a plurality of addresses, in such a manner as to have a sample pixel value stored in each address;
   comparing the pixel value corresponding to said determined pixel position in the selected image with said background history, and, if said pixel value from the selected image substantially matches at least a predetermined number of sample pixel values of said background history:
      classifying said determined pixel position as belonging to the image background; and
      updating said background history by replacing one of its sample pixel values with said pixel value from the selected image;
and characterized in that:
   the address of the sample pixel value to be replaced is randomly chosen; dividing said selected image into a plurality of sub-sampling areas; randomly selecting one such determined pixel position in each sub-sampling area as representative of the whole sub-sampling area; and detecting the image background.

2. The method according to claim 1, further comprising a random update selection step, wherein it is randomly determined with a predetermined background history update probability whether said updating step is to be carried out or not.

3. The method according to claim 2, wherein at least one auxiliary history, corresponding to said determined pixel position and also comprising a plurality of addresses, is also established in such a manner as to have a sample pixel value stored in each address, and further comprising the steps, if said pixel value from the selected image does not substantially match at least said predetermined number of sample pixel values of the background history, of:
   comparing said pixel value from the selected image with said auxiliary history, and, if it substantially matches at least a further predetermined number of said sample pixel values in said auxiliary history:
      randomly determining with an auxiliary history update probability factor higher than the background history update probability factor whether the additional history is to be updated or not; and, if yes,
         updating said auxiliary history by replacing a sample pixel value from a randomly selected address in the auxiliary history with said pixel value from the selected image.

4. The method according to claim 3, which, if said pixel value from the selected image substantially matches at least said further predetermined number of sample pixel values of said auxiliary history, further comprises the steps of:
   randomly determining with a predetermined background seeding probability lower than the auxiliary history update probability whether the background history is also to be updated with the pixel value from the selected image; and, if yes, updating the background history by replacing a sample pixel value from a randomly selected address in the background history with said pixel value from the selected image.

5. The method according to claim 1, wherein the step of establishing said background history comprises reading pixel values in neighbouring pixel positions in at least one image of said plurality of related images other than said selected image, and storing these pixel values, randomly sorted in the plurality of addresses of said background history, as sample pixel values.

6. The method according to claim 5, wherein said neighbouring pixel positions are randomly chosen within a neighbourhood of the determined pixel position.

7. A The method according to claim 1, wherein, if said pixel value in said determined pixel position of said selected image substantially matches at least said predetermined number of sample pixel values in the background history of said determined pixel position, a background history corresponding to a neighbouring pixel, comprising another plurality of addresses, and established in such a manner as to have a sample pixel value stored in each address, is also updated by replacing the sample pixel value in a randomly chosen address in said background history of the neighbouring pixel with the pixel value of the determined pixel position in the selected image.

8. The method according to claim 7, wherein the position of the neighbouring pixel is randomly chosen within a neighbourhood of the determined pixel position.

9. The method according to claim 7, further comprising a random neighbouring pixel history update selection step, wherein it is randomly determined with a predetermined neighbouring pixel background history update probability whether a neighbouring pixel history is to be updated or not.

10. A The method according to claim 1, further comprising a step of reallocating a background history of another pixel position to said determined pixel position within said image in response to image motion, such as panning or zooming.

11. The method according to claim 10, wherein the pixel position from which the background history is reallocated is based on the motion detected by a motion sensor of the imaging device.

12. The method according to claim 10, wherein the pixel position from which the background history is reallocated is based on a zoom value of the imaging device.

13. The method according to claim 10, wherein the pixel position from which the background history is reallocated is determined based on a correspondence obtained by a block matching algorithm.

14. A data detection device programmed so as to carry out the image background recognition method according to claim 1.

15. The imaging device with an embedded data processing device according to claim 14.

16. A video-surveillance system comprising an imaging device and the data processing device according to claim 14.

17. A videogame system comprising an imaging device and the data detection device according to claim 14.

18. A non-transitory data storage medium storing a set of instructions for the data processing device to carry out an image background detection method according to claim 1.

* * * * *